United States Patent [19]
Couch, Jr. et al.

[11] Patent Number: 5,170,033
[45] Date of Patent: Dec. 8, 1992

[54] SWIRL RING AND FLOW CONTROL PROCESS FOR A PLASMA ARC TORCH

[75] Inventors: Richard W. Couch, Jr., Hanover; Lifeng Luo, Lebanon, both of N.H.; Nicholas A. Sanders, Norwich, Vt.

[73] Assignee: Hypertherm, Inc., Hanover, N.H.

[21] Appl. No.: 682,991

[22] Filed: Apr. 12, 1991

Related U.S. Application Data

[63] Continuation-in-part of Ser. No. 513,780, Apr. 24, 1990, Pat. No. 5,070,227.

[51] Int. Cl.$^5$ .............................................. B23K 9/00
[52] U.S. Cl. ..................... 219/121.51; 219/121.54; 219/121.55; 219/121.48; 219/121.5
[58] Field of Search ............... 219/121.51, 121.50, 219/121.52, 121.48, 74, 75, 121.55, 121.54

[56] References Cited

U.S. PATENT DOCUMENTS

| | | |
|---|---|---|
| 3,575,568 | 4/1971 | Tateno . |
| 3,641,308 | 2/1972 | Couch, Jr. et al. . |
| 3,770,935 | 11/1973 | Tateno et al. . |
| 3,833,787 | 9/1974 | Couch, Jr. . |
| 3,949,188 | 4/1976 | Tateno . |
| 4,203,022 | 5/1980 | Couch, Jr. et al. . |
| 4,421,970 | 12/1983 | Couch, Jr. . |
| 4,625,094 | 11/1986 | Marhia et al. ............... 219/121.5 |
| 4,692,582 | 9/1987 | Marhic . |
| 4,791,268 | 12/1988 | Sanders et al. ............. 219/121.52 |
| 4,816,637 | 3/1989 | Sanders et al. . |
| 4,861,962 | 8/1989 | Sanders et al. ............... 219/121.5 |
| 4,896,016 | 1/1990 | Broberg et al. ............. 219/121.57 |
| 4,902,871 | 2/1990 | Sanders et al. ............. 219/121.51 |
| 4,918,283 | 4/1990 | Yamade et al. . |
| 4,967,055 | 10/1990 | Raney et al. ................. 219/121.5 |
| 5,013,885 | 5/1991 | Carkhuff et al. . |
| 5,017,752 | 5/1991 | Severance, Jr. et al. . |
| 5,023,425 | 6/1991 | Severance, Jr. . |

FOREIGN PATENT DOCUMENTS

| | | | |
|---|---|---|---|
| 45-9853 | 4/1970 | Japan . | |
| 51-16379 | 5/1976 | Japan . | |
| 51-21945 | 7/1976 | Japan . | |
| 56-141371 | 8/1981 | Japan . | |
| 57-68270 | 4/1982 | Japan . | |
| 58-205676 | 11/1983 | Japan . | |
| 60-55221 | 12/1985 | Japan . | |
| 62-33025 | 7/1987 | Japan . | |
| 0030180 | 2/1988 | Japan | 219/121.51 |
| 64-9112 | 2/1989 | Japan . | |
| 64-83376 | 3/1989 | Japan . | |

Primary Examiner—Mark H. Paschall
Attorney, Agent, or Firm—Wolf, Greenfield & Sacks

[57] ABSTRACT

A process and apparatus for reducing wear of an electrode in a plasma arc torch involves providing a substantial pressure drop in a flow of plasma gas from the torch to a plasma arc chamber defined by the electrode and a nozzle. The pressure drop is immediately before the plasma arc chamber. There is also a small, localized supply of the plasma gas located between the pressure drop and the plasma chamber. The supply is sufficient to stabilize the arc when the gas flow is cut off upstream of the pressure drop and the arc current is cut off very shortly thereafter. The pressure drop is small enough to permit an adequate flow of plasma gas to the plasma arc chamber during normal operations, but large enough to isolate residual gas in the torch from the plasma arc chamber when the arc current is cut off. The apparatus is preferably a swirl ring with an annular pre-chamber fed by a set of choke holes to feed gas to the chamber and create the pressure drop. A set of swirl holes feed gas from the pre-chamber to the plasma arc chamber.

14 Claims, 8 Drawing Sheets

SWIRL RING AND FLOW CONTROL PROCESS FOR A PLASMA ARC TORCH

REFERENCE TO RELATED APPLICATIONS

This application is a continuation in part of U.S. application Ser. No. 07/513,780 filed on Apr. 24, 1990, now U.S. Pat. No. 5,070,227.

BACKGROUND OF THE INVENTION

This invention relates in general to plasma arc cutting and welding processes and apparatus. More specifically, it relates to a process and apparatus for reducing electrode wear, particularly in high power torches.

Plasma arc torches have a wide variety of applications such as the cutting of thick plates of steel and the cutting of comparatively thin sheets of galvanized metal commonly used in heating, ventilating and air conditioning (HVAC) systems. The basic components of a plasma arc torch include a torch body, an electrode (cathode) mounted within the body, a nozzle (anode) with a central exit orifice, a flow of an ionizable gas, electrical connections, passages for cooling, and arc control fluids, and a power supply that produces a pilot arc in the gas, typically between the electrode and the nozzle, and then a plasma arc, a conductive flow of the ionized gas from the electrode to a workpiece. The gas can be non reactive, e.g. nitrogen, or reactive, e.g. oxygen or air.

Various plasma arc torches of this general type are described in U.S. Pat. Nos. 3,641,304 to Couch and Dean, 3,833,787 to Couch, 4,203,022 to Couch and Bailey, 4,421,970 to Couch, 4,791,268 to Sanders and Couch, 4,816,637 to Sanders and Couch, and 4,861,962 to Sanders and Couch, all commonly assigned with the present application. Plasma arc torches and related products are sold in a variety of models by Hypertherm, Inc. of Hanover, New Hampshire. The MAX 100 brand torch of Hypertherm is typical of the medium power torches (100 ampere output) using air as the working gas and useful for both plate fabrication and HVAC applications. The HT 400 brand torch is typical of the high power torches (260 amperes) often using oxygen as the working gas. High power torches are typically water cooled and used to pierce and cut thick metal sheets, e.g. 1 inch thick mild steel plate.

In all plasma arc torches, a common and heretofore unsolved problem has been a substantial wear of the electrode, particularly when the electrode is used with reactive gases such as oxygen or air. (Improved wear, other conditions being the same, is observed when using non reactive gases such as nitrogen or argon as the plasma gas, but the performance using pure oxygen is superior at least when used to cut certain materials such as mild steel. Similarly, air is superior to pure oxygen with respect to wear, but there is again a performance trade off.) As an example of this wear problem, the standard electrode for the MAX 100 brand torch of Hypertherm, Inc. shows wear as a generally concave pit on the lower end of the electrode, or more precisely, on an emitting element of hafnium mounted on the electrode. On average a wear depth of about 0.025 inch is observed in such a Hypertherm brand electrode after 120 cut cycles operating with oxygen or air. The wear results of commercially available units of others, as measured by Hypertherm, Inc., are typically worse. For the MAX 100 brand torch, when the wear produces a pit depth of 0.060 inch or more, Hypertherm, Inc. recommends that the electrode be replaced. In ordinary use, the electrode of a plasma arc cutting torch operating with reactive gases typically requires replacement after 0.5 to 2 hours of use depending strongly on the number of on off cycles. Wear considerations are significant not only because they necessitate the repeated replacement of a component, but also because they limit the maximum power that can be applied to a given torch. With particular reference to the present invention, it has proven especially difficult to control electrode wear in high current torches, e.g. the water cooled torches sold by Hypertherm, Inc. under the trade designation HT 400 and PAC 500, respectively.

In plasma arc cutting, it is also important to note that the quality of the cut is highly dependent on the flow pattern of the gas in a plasma chamber, defined at least in part as the region between the electrode and the nozzle. In particular, a swirling flow produced by injecting the gas tangentially into the plasma chamber has been found to be essential to produce a high quality cut. A swirling gas flow pattern is also important in stabilizing the plasma arc so that it exits the torch to attach to and cut the workpiece, but does not contact the torch nozzle itself. The nozzle is the principal component that is damaged by the arc when the arc is not well controlled. Heretofore the swirling gas flow is often produced mainly by a swirl ring that has angled holes formed in the ring that feed a swirling gas flow to the plasma chamber. The aforementioned U.S. Pat. No. 4,861,926, also describes a swirling secondary cooling gas flow passing between the nozzle and a surrounding shield member to assist in the arc stabilization.

Another design consideration is the very high temperatures of the plasma, e.g. greater than 10,000° C. These temperatures introduce corresponding changes in the gas properties such as its density and viscosity. These considerations are significant on start up and cut-off. On start up the arc rapidly heats the gas which significantly decreases the gas density exiting the nozzle orifice. This presents the situation where the gas flow is choked in the nozzle orifice region. This choking is, in general, advantageous during cutting since it restricts the flow of gas from plasma chamber to atmosphere and thereby maintains an elevated gas pressure level in the plasma chamber that constricts the arc. This leads to an improved cut. A typical gas pressure in the plasma chamber to achieve these beneficial effects in a medium to high power torch is about 40 psig. On cut-off of the arc current, the situation reverses and there is a tendency for the gas in the plasma chamber to cool and blow out of the chamber very suddenly.

It is common industry practice to use hafnium or zirconium as the cathodic emitter insert in the electrode. Hafnium, as of today, is the best choice for the cathodic emitting element when cutting with a reactive gas plasma. It exhibits the least wear of all other materials tried for this application, but is more costly than other materials. These electrodes nevertheless require frequent replacement. Lower wear has been associated with lower current levels, but at some point the reduction in performance associated with a reduced operating current becomes too great. Cooling the electrode has also been used to increase electrode life, whether by way of a gas flow or water flow placed in good thermal communication with the electrode. However, water cooling is expensive, cumbersome and is not desirable for low current units, e.g. those rated below 100 amperes. Air cooling is less efficient and limits the maximum operating current of the torch, even one carrying a comparatively low current. Therefore, to date, the only practical solution to the electrode wear problem has been to replace the entire electrode again and again, despite the clear economic disadvantages of this approach.

It is therefore a principal object of the present invention to reduce the wear on the electrode of a plasma arc torch significantly and thereby extend its life.

Another principal object of this invention is to reduce electrode wear and thereby allow operation at higher current levels than are presently feasible, even when operating with reactive gases.

Still another principal object of this invention is to provide a swirl ring which in addition to producing a swirling output of the gas also controls the gas flow to the plasma chamber and the distribution of the gas in the plasma chamber Another object of the invention is to achieve a better cut quality than has heretofore been possible by allowing a greater level of swirl.

Another object of the invention is to provide the foregoing advantages while using standard electrode and nozzle constructions and without any significant increase in the incidence of damage to torch parts such as nozzle gouging.

Yet another object of the invention is to provide the foregoing advantages for existing plasma arc torch systems using only comparatively simple and inexpensive modifications.

A still further object is to provide the foregoing advantages at a favorable cost of manufacture and operation.

SUMMARY OF THE INVENTION

A plasma arc cutting torch, particularly one using a reactive gas and employed in cutting metallic materials, has a torch body that mounts an electrode and a nozzle in a spaced relationship to define a plasma chamber therebetween. An ionizable gas is fed by an inlet system which can consist of tubes, passages and/or chambers to and through the torch body to a swirl ring mounted in the torch body. The swirl ring feeds the gas to the plasma chamber in a swirling flow pattern where it is ionized and exits the torch via a central exit orifice formed in the nozzle. The torch also includes standard electrical connections to a power supply and an electrical controller to initiate a pilot arc in the gas in the chamber and then transfer the arc to a workpiece for cutting or other operations.

The swirl ring of the present invention is an annular member mounted in the torch body adjacent the electrode, the nozzle and the plasma chamber. It is typically secured between the torch body and the nozzle. The swirl ring includes a pre chamber, preferably an annular recess extending around the outer surface of the swirl ring. A set of choke passages are formed in an upstream face of the swirl ring to conduct gas from the gas inlet system in the torch body to the pre chamber. The number, distribution and size of these choke passages restrict the gas flow and thereby introduce a gas pressure drop on the feed line immediately before the plasma chamber. The plasma gas exits the pre chamber to the plasma chamber via a set of angled holes found in the downstream face of the swirl ring. In the preferred form the swirl ring also includes a set of radial outlet holes leading from the pre-chamber to the plasma chamber.

The swirl ring includes annular recesses for o-rings that seal the swirl ring to the torch body at its upstream face, to the nozzle at its downstream face, and to a current ring or other surrounding torch component at its outer lateral face. In the preferred form the pressure drop along the gas inlet holes to the swirl ring is about 32 psi when the plasma reaches steady state and the gas pressure in the plasma chamber is about 40 psi.

This gas control swirl ring is particularly useful when the electrode wear is further controlled by altering the mass flow rate of the gas, and/or its flow pattern, immediately before and immediately after the step of cutting off of the current to the torch. The mass flow rate is reduced by either closing off or reducing the gas flow to the plasma chamber. This mass flow rate reduction is timed to occur within a few hundred milliseconds before the current cut off, and preferably continue after cut off. The process step of cutting the arc current can be accomplished by a sudden step function of time or a gradual ramp function of time. The reduction in the gas flow may be coupled with a venting of the plasma chamber to atmosphere to facilitate a more rapid change in the gas flow pattern in the plasma chamber.

The present swirl ring with gas control invention can also be viewed as a process characterized principally by the creation of a pressure drop in the gas feed line to the plasma chamber at a point immediately before the plasma chamber. This pressure drop is sufficiently low that at steady state operation the arc is stable and well controlled. The pressure drop is also sufficiently high that when the gas flow to the torch is cut off, the gas flow through the plasma chamber is also cut off rapidly. This limits a sudden and large outrush of gas from the plasma chamber as the arc extinguishes and the plasma gas cools. The process includes providing a small localized source of gas immediately adjacent the plasma chamber so that there is sufficient gas available to the plasma chamber to maintain control over the arc after the gas flow is cut off, but before the arc is fully extinguished and could otherwise damage the torch. These process features can also be achieved by placing the aforementioned flow restrictions and pre-chamber in a torch component or components other than the swirl ring, such as a portion of the torch body adjacent the plasma chamber.

These and other features and objects of this invention will be more fully understood from the detailed description which should be read in light of the accompanying drawings.

DETAILED DESCRIPTION OF THE PREFERRED EMBODIMENTS

Figure 1A:
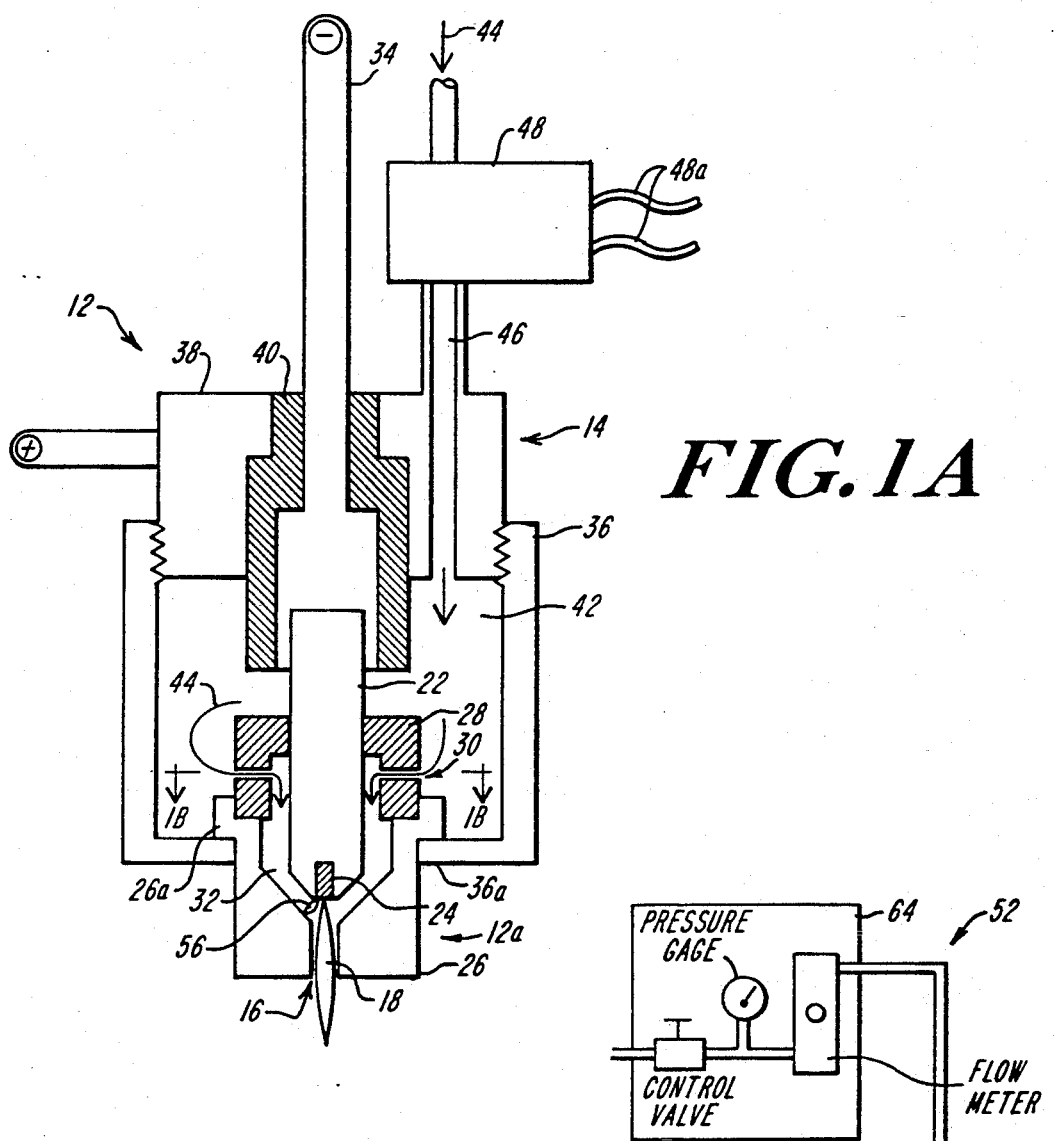
FIG. 1A is a simplified schematic view of a prior art typical plasma arc torch connected to a gas flow control that controls,, the gas flow to the torch to reduce electrode wear.
Figure 1B:
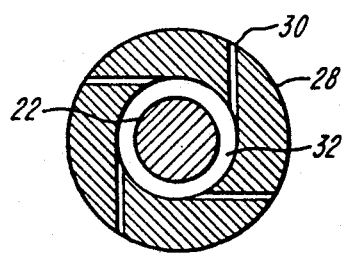
FIG. 1B is a view in horizontal section along the line 1B—1B in FIG. 1A.

FIGS. 1A and 1B show in simplified schematic form a typical plasma arc cutting torch 12 such as any of a variety of models of torches sold by Hypertherm, Inc. The immediately following description is therefore intended to illustrate the basic principles and elements common to plasma arc cutting torches of this type, but not to describe construction details of any particular torch model. The torch has a body indicated generally at 14 which typically is cylindrical with an exit orifice 16 at one end, the lower end 12a as shown, through which a plasma arc 18, an ionized gas jet, passes and attaches to a metal workpiece 20 which is being cut. The gas can be non-reactive, such as nitrogen or a noble gas, but it can also be reactive, such as oxygen or air. A significant advantage of the swirl ring and associated gas control process of the present invention is that the torch can operate with a reactive gas and nevertheless have dramatic improvement in electrode wear even when operating at high power levels.

The torch body 14 supports a cathode 22, commonly referred to as an electrode, which is typically made of copper and has a generally cylindrical configuration. An emitting element 24 is press fitted into the lower end face of the electrode 22. The electrode and the emitting element are centered within the torch body and aligned with the exit orifice 16. When using a reactive gas, the insert is typically formed of hafnium or zirconium. The body 14 also mounts a nozzle 26 with a central nozzle orifice that defines the torch exit orifice 16. The nozzle is spaced from the electrode. A swirl ring 28 of conventional construction and having a set of radially offset gas distribution holes 30 is replaceably mounted in the torch body. It is positioned to feed a flow of the plasma gas from the holes 30 to a plasma arc chamber 32 defined, as shown, by the electrode, the nozzle and the swirl ring.

With this prior art conventional swirl ring the offset of the holes, best seen in FIG. 1B, introduces a tangential velocity component to the gas flow through the chamber 32 causing it to swirl. With the electrode wear reduction advantages described herein, the level of swirl introduced by these holes can be greater than has heretofore practicable resulting in a better cut quality than has heretofore been attainable. The swirl ring is shown in a tight fitting, gas sealed relationship to the electrode. It will be understood, however, that the swirl ring is often mounted in a support member and does not itself seal to the electrode. More generally, the particular construction details of the torch body and arrangements for mounting these elements directing gas and cooling fluid flows and providing electrical connections can and do take a wide variety of forms.

A negative power lead 34 surrounds the upper end of the electrode 22 to make a good electrical connection. A retaining cap 36 threads onto a current ring 38 that forms the upper end of the torch body 14. An insulator sleeve 40 separates and electrically isolates the current ring 38 from the negative power lead 34. The retaining cap has a lower lip 36a which engages a flange 26a on the nozzle in an abutting relationship. The retaining cap when tightened onto the ring 38 captures and replaceably secures the nozzle against the swirl ring. In an alternative construction not shown, it can also capture and secure the swirl ring between the nozzle and another internal support structure within the torch body. In the configuration shown, the retaining cap 36 also, in part, defines a gas plenum chamber 42 that acts as a local supply to the swirl ring 28 and the plasma chamber 32. A flow 44 of plasma gas passes through an inlet tube 46 which penetrates the current ring 38 to feed the gas to the plenum chamber 42. A solenoid valve 48 such as Model No. AFP33183 manufactured by Automatic Switch Company is secured in the inlet tube, preferably at a point closely spaced from the torch body. Control signals to the valve over lines 48a,48a open and close the valve to regulate the flow rate of the gas to the torch. In a pilot arc mode of operation, where a pilot arc is drawn between the electrode and the nozzle through the gas in the plasma chamber, the nozzle acts as an anode and the cap 36 and current ring 38 form a pilot arc current return circuit.

In operation, plasma gas 44 flows through the solenoid valve 48 and the inlet tube 46 into the plenum chamber 42. From there, it flows through the gas distribution holes 30 in the swirl ring 28 into the plasma arc chamber 32 and finally out of the torch through the nozzle orifice 16. When the torch is operating in the nontransferred pilot arc mode, a power supply 50 provides current to the torch at an appropriate voltage to initiate the pilot arc and then maintain it. The power supply can be any conventional regulated D.C. supply and includes a p.c. board or the like which controls the operation of the power supply and other components of the torch system such as flow control valves.

Figure 1C:
FIG. 1C simplified schematic view of a plasma arc cutting system using the torch shown in FIGS. 1A and 1B.

With reference to the complete plasma arc cutting torch system 52 depicted in FIG. 1c, the complete current path in the nontransferred pilot arc mode is from the negative power supply terminal 50a, through lead 54, the negative power lead 34, electrode 22, a pilot arc plasma 56 (FIG. 1A), the nozzle 26, the retaining cap 36, the current ring 38, a pilot arc return lead 58, a closed pilot arc switch 60, and a power supply positive terminal 50b. When the torch 12 is lowered toward the workpiece 20, the arc transfers to the workpiece as the ionized plasma jet 18. This allows some current to flow from the workpiece through a ground lead 62 back to the power supply positive terminal 50b. When this transferred current path is established, the pilot arc switch opens and the torch is cutting the workpiece. In this transferred or cutting mode, the current path is from the power supply negative terminal 50a, the lead 54, negative power lead 34, electrode 22, the plasma arc or jet 18, the workpiece 20, the ground lead 62 and the power supply positive terminal 50b.

An operator sets a desired gas flow or pressure associated with full power operation in a transferred arc mode prior to initiating the pilot arc at a control console 64 which is removed from the torch itself. The console includes gas flow regulators, gas valving, and pressure gauges. The flow and pressure values set by the operator at the console correspond in a known way to the actual gas flow and pressure in the plasma chamber 32 prior to the pilot arc. Starting the pilot arc heats the gas causing an increase in the gas temperature within the chamber and a decrease in the flow, in a manner well known in the art. A typical gas pressure in the chamber 32 during the pilot arc is 20 to 40 psi. For high power torches which are the particular focus of the present invention, the gas pressures are usually at or near 40 psi. The pilot arc is started by a high-frequency spark or other means, such as a contact starting technique, all of which are well known in the art. During start up the plasma gas 44 flows through the tube 46, solenoid valve 48, plenum chamber 42, swirl holes 30, the plasma chamber 32 and out the exit orifice 16. As noted above, the swirling flow established by the holes 30 is very important in obtaining a good quality cut and in stabilizing the arc within the nozzle exit orifice 16—to prevent the arc from impinging on the nozzle and gouging it. As will be discussed in detail below, the operational life of the electrode can be increased further by utilizing a novel start up procedure and the apparatus illustrated in FIGS. 4 and 5 and the novel swirl ring and associated gas flow control functions described with reference to FIGS. 6-8.

Also as noted above, the torch begins cutting when it is brought close to the workpiece so that the arc transfers to the workpiece and the controller opens switch 60. After transfer, in normal operation the controller increases the current level to a predetermined value for cutting. This increase in current also results in an increase in the heating of the plasma gas, a further increase in the gas pressure in the plasma chamber, and a further decrease in the gas flow out of the nozzle exit orifice. The maximum recommended current levels vary greatly among different torches and applications, with currents in the range of about 20 to 200 amperes D.C. being characterized as low currents and those 200 and above being high currents. A typical current level for a water cooled cutting torch used to cut plate steel is 260 amperes.

A discovery of applicants is that a significant loss of material (wear) of the electrode during its operation occurs not during the actual cutting, but rather when the current to the arc is shut off. While the mechanisms for this wear are not fully understood, there is evidence that the electrode becomes molten, at least in part, during operation and that on cut-off of the electrical power wear is related to a complicated interaction between the molten surface(s) of the electrode and the flow and pressure of the plasma gas through the plasma chamber.

The swirl ring and associated gas flow control process of the present invention builds on applicants' discovery that a control of the plasma gas flow to the plasma chamber in conjunction with a controlled electrical shut off to reduce electrode wear substantially. In its simplest form, this wear reduction involves a total shut off of the plasma gas flow to the chamber 30 just before (1) a total, step function shut off of the arc current or (2) at the same time the arc current starts a gradual shut off, but also just before a total shut off of the arc current. This effect is achieved by closing the solenoid valve 48 just prior to the total shutting off process of the arc current. The preferred process for shutting off the current is a controlled linear decreasing ramp which follows the decreasing mass flow. The timing of these shut offs is, however, critical. If the gas flow is allowed to decrease rapidly, there is a significant diminution of the swirling plasma flow that stabilizes the arc. Therefore the arc can and will attack and damage, or even destroy, the nozzle in a very short time. On the other hand, if the shut offs are too close in time, the gas flow and pressure in the chamber 30, which decay in a generally exponential manner with the valve 48 shut, exhibit little change and wear occurs to about the same extent as if the valve 48 was left open. The gas flow shut off continues through the arc current shut off, and thereafter.

Figure 1D:
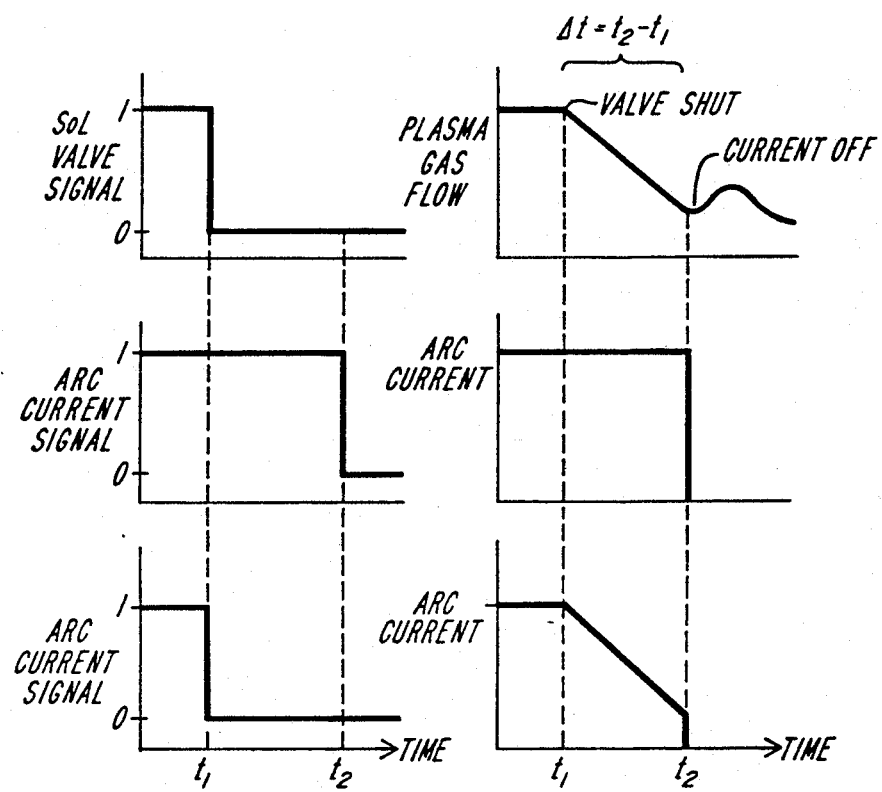
FIG. 1D is a six graph timing diagram of the gas flow alteration in relation to the cut off arc current that has been found to extend electrode life.

The timing of the gas and current shut off processes are illustrated by the timing diagrams of FIG. 1D. The three lefthand graphs show the control signals (whether a voltage signal, current signal, or otherwise) as a function of time. The first lefthand graph shows a control signal (applied over lines 48a,48a) to the solenoid valve 48 changing its state at a time $t_1$ (the signal goes from a "1" state to a "0" state which are indicative of either a digital switching or an analog change sufficient to produce the desired change in state of the valve 48). This change in the control signal closes the valve at $t_1$. The second lefthand graph shows a control signal for the arc current, a signal generated by the controller of the power supply 50. The arc current control signal changes its state, again shown as a change from a "1" state to a "0" state, at a time $t_2$ which is after time $t_1$. The gas flow is therefore cut off before the arc current by a time interval $\Delta t$ equal to the difference between $t_2$ and $t_1$. The third lefthand graph shows an alternative control sequence for the arc current cut-off process. In accordance with this invention the arc current control signal changes its state, again shown as a change from a "1" state to a "0" state, at a time $t_1$ which is the same time as the valve control signal. This change commences the operation of the controller to produce a ramp down of the arc current as shown in the lowermost righthand graph of FIG. 1D.

The righthand graphs in FIG. 1D show: 1) the gas flow rate through the plasma chamber 32; 2) the arc current shut off process as a sudden step off at $t_2$; and 3) an alternative arc current shut off process as a gradual linear ramp down from full current at $t_1$ to a minimum sustainable current at $t_2$ when the arc current snuffs out to zero. These graphs are also presented as a function of time and for the same periods of time as the corresponding lefthand graphs. After closing the valve 48 at $t_1$, the gas flow falls steadily. A generally linear fall off in flow is shown, but the relationship is actually more complex and the curve is in fact generally exponential. The important factor is that the gas flow value falls substantially over the internal $\Delta t$ so that a) it is at a comparatively low value at $t_2$ when the arc current is shut off, as illustrated by the second righthand graph of FIG. 1D, or b) it is a comparatively low value at $t_2$ following the current ramping down illustrated by the third righthand graph of FIG. 1D. The presently preferred arrangement is to use a non-vented ramp down of the gas flow as shown in the upper righthand graph in combination with an arc current ramp down as shown in the lower righthand graph that follows the change of the gas flow over the time interval $\Delta t$. This preferred mode of operation seems to produce the least wear despite the fact that a lower arc current changes the gas density in a manner that produces an increased gas flow rate through the plasma chamber—other factors being constant. The swirl ring described below with respect to FIGS. 6-8 addresses the problem of this increased gas flow rate.

While the precise value of $\Delta t$ varies with each torch and the particular operating parameters, for most low current plasma arc cutting applications a $\Delta t$ of 500 milliseconds or less has been found to be the right timing to reduce electrode wear. For the MAX 200 brand torch, a $\Delta t$ of roughly 250 to 300 milliseconds without venting and with a following current ramp down has been found to be optimal. In the operation of a MAX 100 brand torch after 120 cut cycles using this gas flow/arc current control there is a pit depth (wear) of about 0.005 inch, whereas normal operation without these controls produces a wear depth of about 0.025 inch in the same electrode insert 24. This wear reduction translates into an electrode life which is five times the best value that has ever before been attainable. This gas flow/arc current control may also allow, on average, torches to be operated at powers in excess of their conventional ratings.

Note that at $t_2$ there is still a residual gas flow even though the gas feed is cut off at $t_1$. This ensures that until and at current cut off there is a sufficient flow in the chamber to stabilize the arc and prevent nozzle damage. Also, there is a brief surge in the flow after cut off of the current. This is believed to reflect a sudden cooling of the gas in the absence of the arc and a rapid out flow of gas from the torch driven by the gas pressure in the plasma chamber and the sudden change in the properties of the gas after the arc is extinguished. This rapid out flow can be analogized to an explosive decompression. It is particularly troublesome in the high power torches.

This out flow phenomena suggests that while the gas flow to the torch can be reduced over the interval $\Delta t$ by reducing the flow 44 to the plasma torch, that a complete closure of the valve 48 is preferred since this closure upstream of the plasma chamber dampens the strength of the flow surge and limits the total volume of the flow when the current is cut-off. As already stated, it is also contemplated to reduce the current at $t_1$, e.g. by ramping it down over the interval $\Delta t$ rather than having an abrupt shut off at $t_2$. It is also contemplated to allow a reduction in the overall current prior to $t_1$, or after $t_1$, i.e., prior to or after closing the solenoid valve.

Figure 2A:
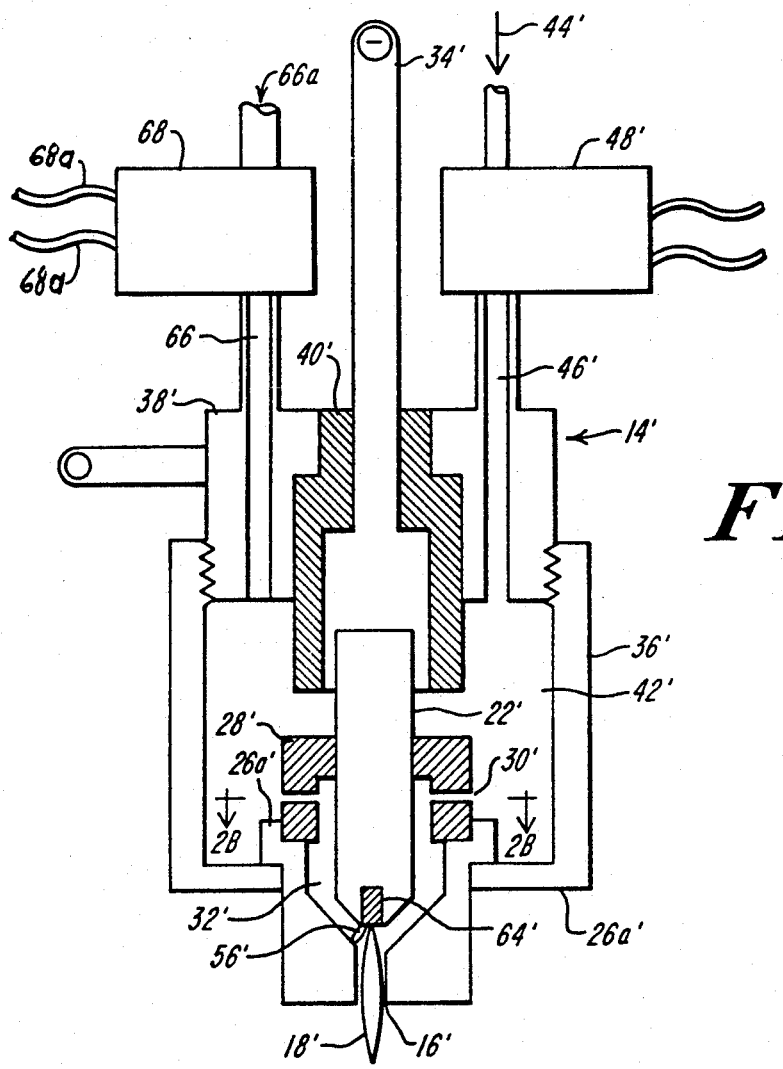
FIGS. 2A, 2B and 2C correspond to FIGS. 1A, 1B and 1C and show an alternative arrangement for electrode wear reduction utilizing a valved vent in combination with a valved gas feed.
Figure 2B:
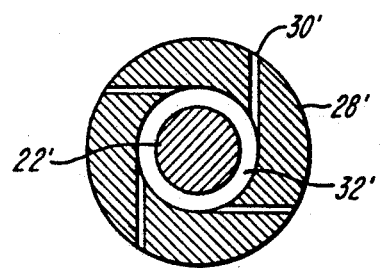
Figure 2C:
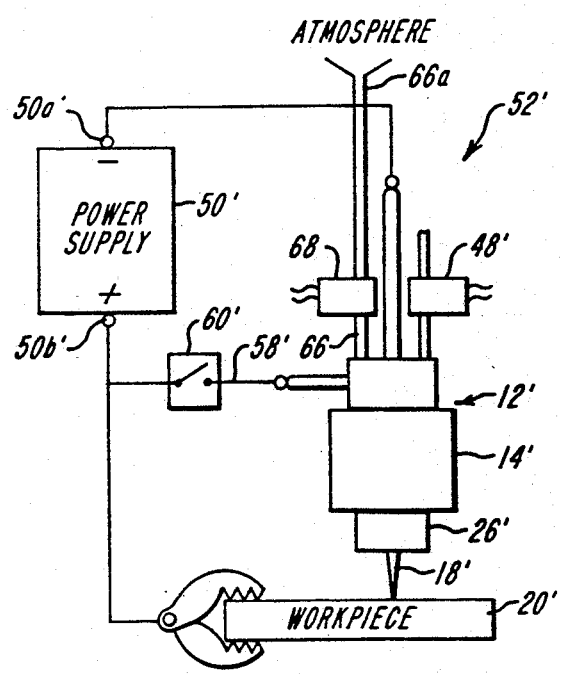

FIGS. 2A-2C show the plasma arc cutting torch 12' incorporating an alternative gas flow control arrangement to reduce electrode wear, like parts in the FIG. 2A-2C embodiment having the same reference numbers as in FIGS. 1A-1C, but with a prime. The structure and mode of operation of the torch 12' and torch system 52' is the same as described above with respect to the FIGS. 1A-1C embodiment, except for the addition of a vent tube 66 and an associated solenoid valve 68 connected in the vent tube to open and close it. The tube 66 penetrates the current ring 38' and is in fluid communication with the plenum chamber 42'. A control signal from the controller carried over lines 68a,68a operates the valve 68. In this embodiment, when the solenoid valve 48 is closed at time $t_1$. The vent valve 68 is opened. Because the vent tube 68 is open at its end 66a at atmosphere, or to some other lower pressure region such as a vacuum chamber, opening the valve 68 causes the gas flow and pressure in the plenum and the plasma chamber to decay more rapidly than the decay of the FIGS. 1A-1C embodiment. This allows the current to be shut off more quickly after the gas flow is cut off at time t1. It has been discovered, however, that timing is very important in this configuration. Since by venting an alternative flow path is established, the flow through the nozzle can go to low values and cause the plasma to become unstable very quickly. In general, when venting is used the flow alteration preceeds the arc current shut off by a significantly short period of time and without venting. With this venting, the interval $\Delta t$ can be reduced from about 250 milliseconds to less than 5 milliseconds when operating a MAX 200 brand torch with air. This may reduce the likelihood of nozzle damage caused by a destabilized arc. It is also contemplated that valves 48' and 68 can be combined in a single venting type valve.

Figures 3A, 3B, 3C, 3D:
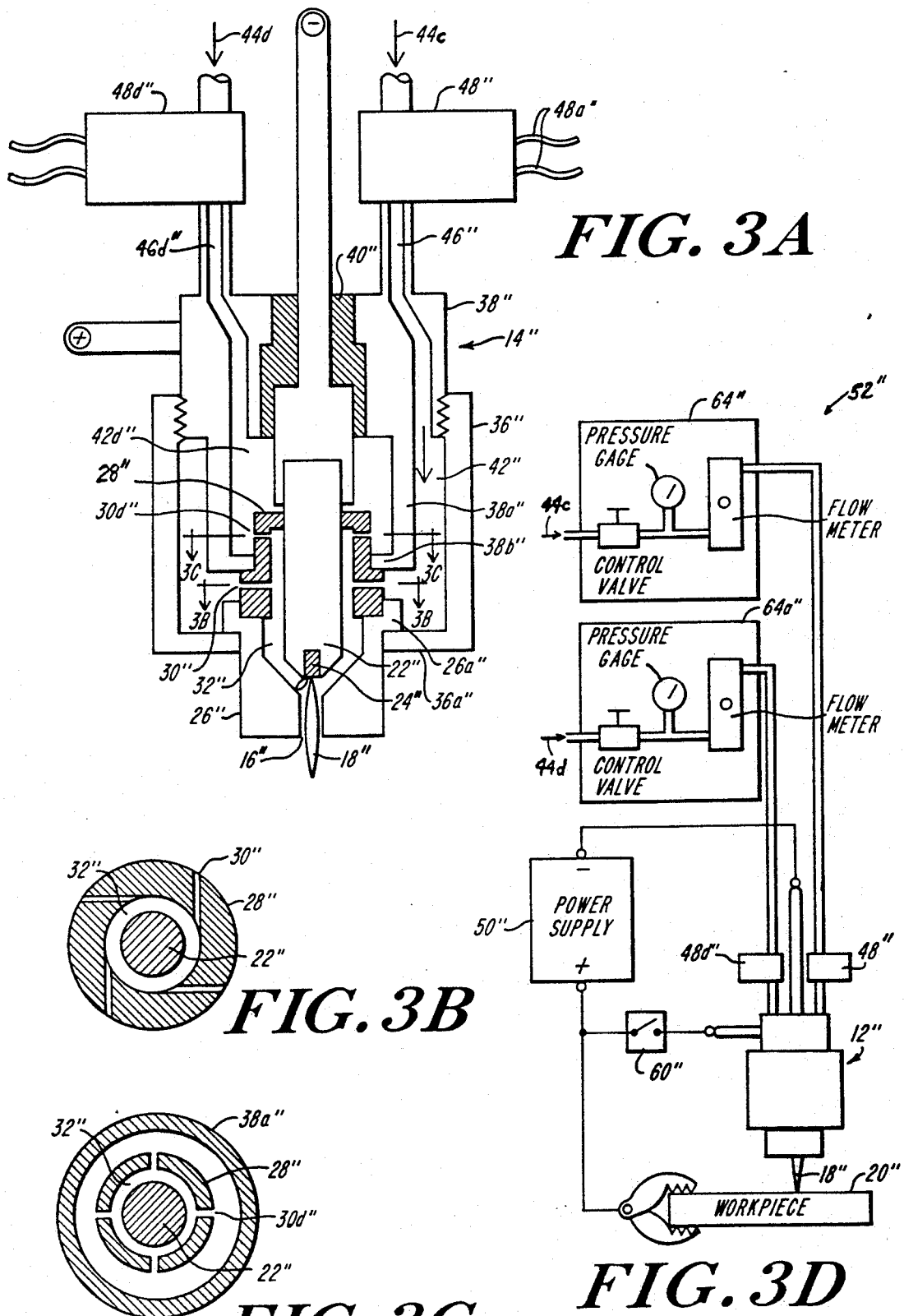
FIGS. 3A, 3B, 3C, and 3D correspond to FIGS. 2A-2C, FIGS. 3B and 3C corresponding to FIG. 2B, and show an alternative arrangement utilizing axial and radial inlet hole sets in a swirl ring to establish either swirled or axial gas flow patterns in the plasma chamber.

FIGS. 3A 3D show another embodiment of a torch 12" and torch system 52" utilizing according to the present invention, like parts being identified with the same reference numbers, but double primed. This embodiment utilizes the discovery that electrode wear can be reduced substantially if the gas flow through the plasma chamber is changed not only in flow rate, but also in flow pattern, just prior to current shut off. More specifically, electrode wear is reduced to almost negligible levels on current shut off if the degree of swirling of the gas is reduced just before cut-off. At moderate gas pressures, this result holds for even high gas flow rates (e.g. 120 scfh). In operation with the Hypertherm ® MAX 100 brand torch, negligible wear was observed when the gas flow into the plasma chamber was radial (no swirl) and the gas pressure in the chamber was below 30 psi. While a perfectly radial flow and moderate to low gas pressures produce the best results, this arrangement also provides reduced electrode wear with less than a perfectly radial flow and at increased gas pressures. In this embodiment a major concern once again is destabilization of the plasma arc in the absence of a swirling flow. Applicants' solution is to use a swirling flow, and then suddenly switch to a radial flow, with substantially no interruption of the overall flow rate, immediately before current cut off. The torch 12" and system 52" accomplish this mode of operation.

The torch 12" has generally the same construction as the torches 12 and 12', except that the torch is serviced by two separate gas feed lines, each with its own solenoid valve, which feed separate plenum chambers and in turn feed separate, independent inlet holes in the swirl ring 28" or an equivalent structure. In the preferred form shown, there is a first gas flow 44c which passes through the inlet tube 46", the valve 48", an annular plenum chamber 42" and out the inlet holes 30", the plasma chamber 32" and out the exit nozzle orifice 16". This gas flow path provides a swirling gas flow for cutting that produces a good quality cut and stabilizes the arc. The swirl is established by the holes 30" which are radially offset as is best seen in FIG. 3B. The plenum chamber 42" is defined by the same components as in previous embodiment except that the current ring has an annular downwardly extending wall 38a and a flange 38b at the lower edge that abuts a step recess in the swirl ring 28'' in a gas tight seal. (It will be understood that the seal can be secured with O-rings, a labyrinth seal, or any conventional gas seal that also allows the swirl ring to be disassembled from the torch as necessary.) The wall 38a and flange 38b separate and isolate from one another the outer plenum chamber 42'' and an inner plenum chamber 42d''.

A gas flow 44d passes through an inlet tube 46d'', a valve 48d'', the plenum chamber 42d'', inlet holes 30d''', the plasma arc chamber 32'' and out the exit nozzle orifice 16''. This second gas flow path for the flow 44d uses inlet holes 30d'' in the swirl ring that are generally radially directed as is best seen in FIG. 3C. The gas flow through the plasma chamber is therefore generally axial (downwardly as shown) through the chamber 32'' to the exit 16''; there is substantially no swirl.

In accordance with this flow pattern altering process for electrode wear reduction, at a predetermined but very brief interval $\Delta t$ before the current to the torch is cut off, the controller closes the valve 48'' for the flow 44c and opens the valve 48d'' for the flow 44d. The interval $\Delta t$ for a MAX 100 brand torch operating with a reacting gas is typically less than 500 milliseconds. This change in flow pattern, with no other changes in flow or current parameters, has also been found to provide dramatic reductions in electrode wear. However, this embodiment can be combined with the mass flow rate reduction embodiment described above with respect to FIGS. 1A-1D and 2A-2C. For example, the current level can be ramped down after $t_1$.

FIG. 3D shows a suitable system 52'' for practicing the invention in this altered flow pattern mode. A control console 64'' remote from the torch and therefore the substantial electromagnetic interference produced by the torch, controls the gas flow 44c. A like console 64a'' controls the flow 44d. In practice the consoles 64'' and 64a'' can be a single unit.

While various time periods have been suggested above for $\Delta t$, the optimal interval will depend on the specific torch, its applications, and related parameters. In general, $\Delta t$ is a function of the type of gas, the current level, size of nozzle orifice, inlet flow area of swirl ring, the gas pressure, the gas flow rate, the gas flow pattern, and the physical separation between the solenoid valves in the inlet and vent tubes and the plasma. The separation is preferably less than 12 inches for the MAX 100 brand torch. This separation helps to control delays and unintended variations in flow parameters due to the presence of a large fluid mass upstream of a plasma chamber and downstream of the valve. The values for an acceptable interval $\Delta t$ can readily be determined empirically. Also, while the invention as described thus far has focused on the alteration of the gas flow just prior to cut off, it should be understood that the altered condition continues through electrical cut off and for a brief period thereafter. However, the flow usually ceases entirely very shortly after cut-off, whether due to a closing of the solenoid valve in the inlet tube which eventually brings the flow through the plasma chamber to zero, or through a closing of the valve 48d'' in the "radial" gas flow path to the radial hole 30d'' in the FIG. 3A-3D embodiment.

Figure 4:
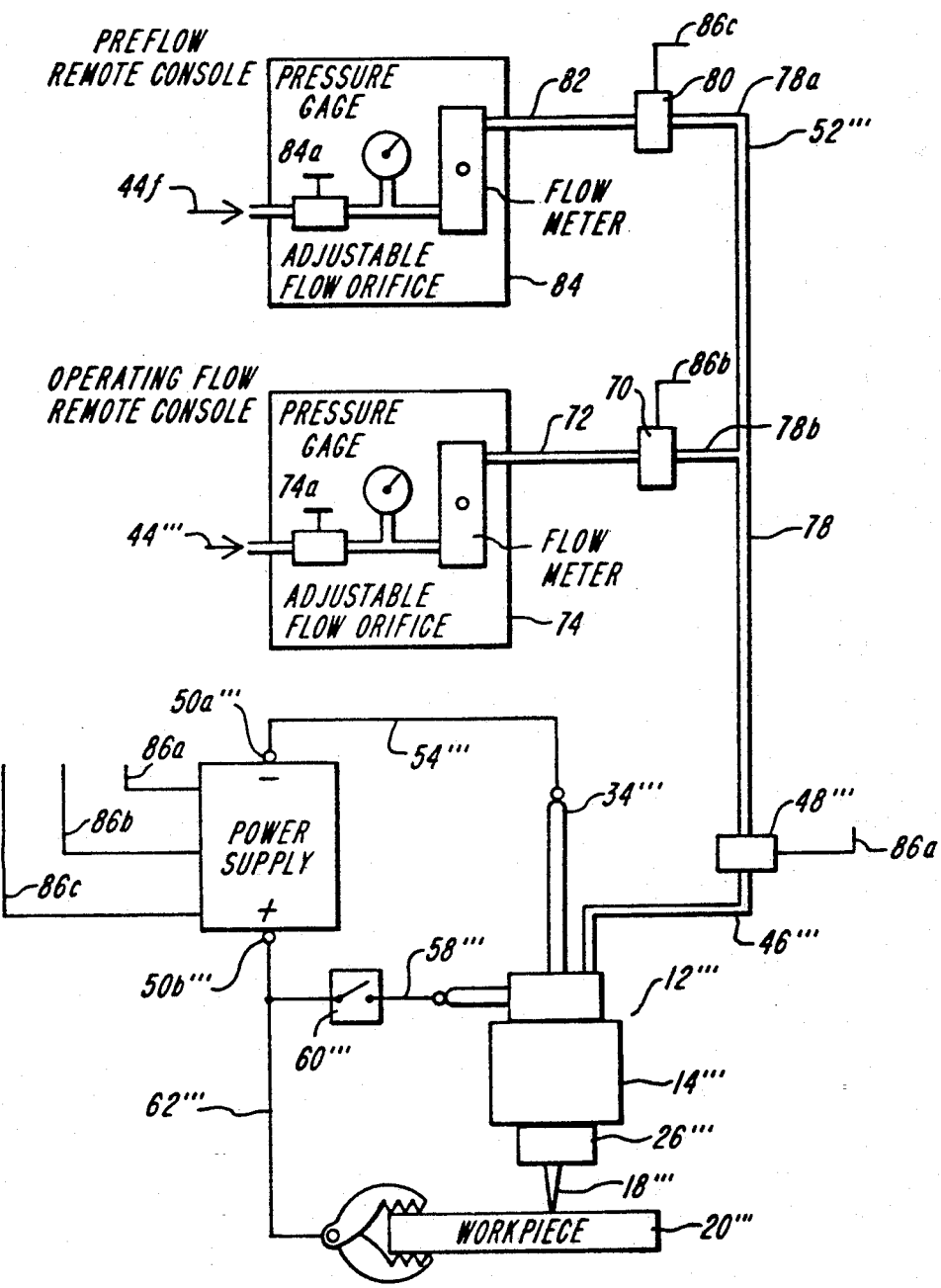
FIG. 4 is a simplified schematic view corresponding to FIG. 1C showing flow control mechanisms in the gas supply line to provide a preflow and ramp up of the flow on start up as well as a ramp down on cut off.

FIG. 4 shows yet another embodiment of a torch 12''' and a torch system 52''', like parts being identified with the same reference number, but triple primed. This embodiment is like the embodiment shown in FIGS. 1A-1D except that it has two sources of plasma gas connected via tube 78 and on off solenoid valve 48''' to the inlet tube 46''' which in turn directs the gas to the interior of the torch 12''' and its plasma chamber. A preflow gas flow 44f flows through the preflow remote console 84 including an orifice 84a, a pressure gauge and a flow meter. The preflow passes through conduit 82 and a preflow on-off solenoid valve 80 into a branch conduit 78a and then into a gas feed tube 78. An operating plasma gas flow 44''' flows through the operating flow remote console 74 including an orifice 74a, a pressure gauge, and a flow meter. The operating gas flow 44''' then passes through a conduit 72 and an on off solenoid valve 70 into a branch conduit 78b, and then into the gas feed tube 78. The two sources of plasma gas are connected in parallel via branch tube 78a and branch 78b to the feed tube 78.

A further discovery of applicants is that significant electrode wear can occur on start up as well as cut off. In particular it has been found that alteration of the gas flow to the torch on start up can make substantial improvements in the electrode life even as compared to the substantial improvements achieved with the cut off controls described above with respect to FIGS. 1A-3D. Specifically, the start up procedure and apparatus described below in detail have been found to double the life of electrodes when also using the cut off procedure and apparatus described with reference to FIGS. 1A-3D. An electrode life about 10 times than that obtainable using prior art procedures and equipment is readily obtainable.

The solenoid valves operate automatically in response to control signals produced by the power supply and directed to the valves over lines 86a, 86b and 86c. The valves 48''', 70 and 80 can also be solenoid feed valves of the type described above with respect to valve 48. The flow orifices 84a and 74a can be adjusted manually or automatically.

In operation, to start the torch 12''' according to the present invention, a preflow 44f of the ionizable gas is directed from the source to the torch. The preflow is at a significantly lower flow rate and pressure that the gas flow rate and pressure associated with full power operation when the arc has transferred to a workpiece.

Figure 5:
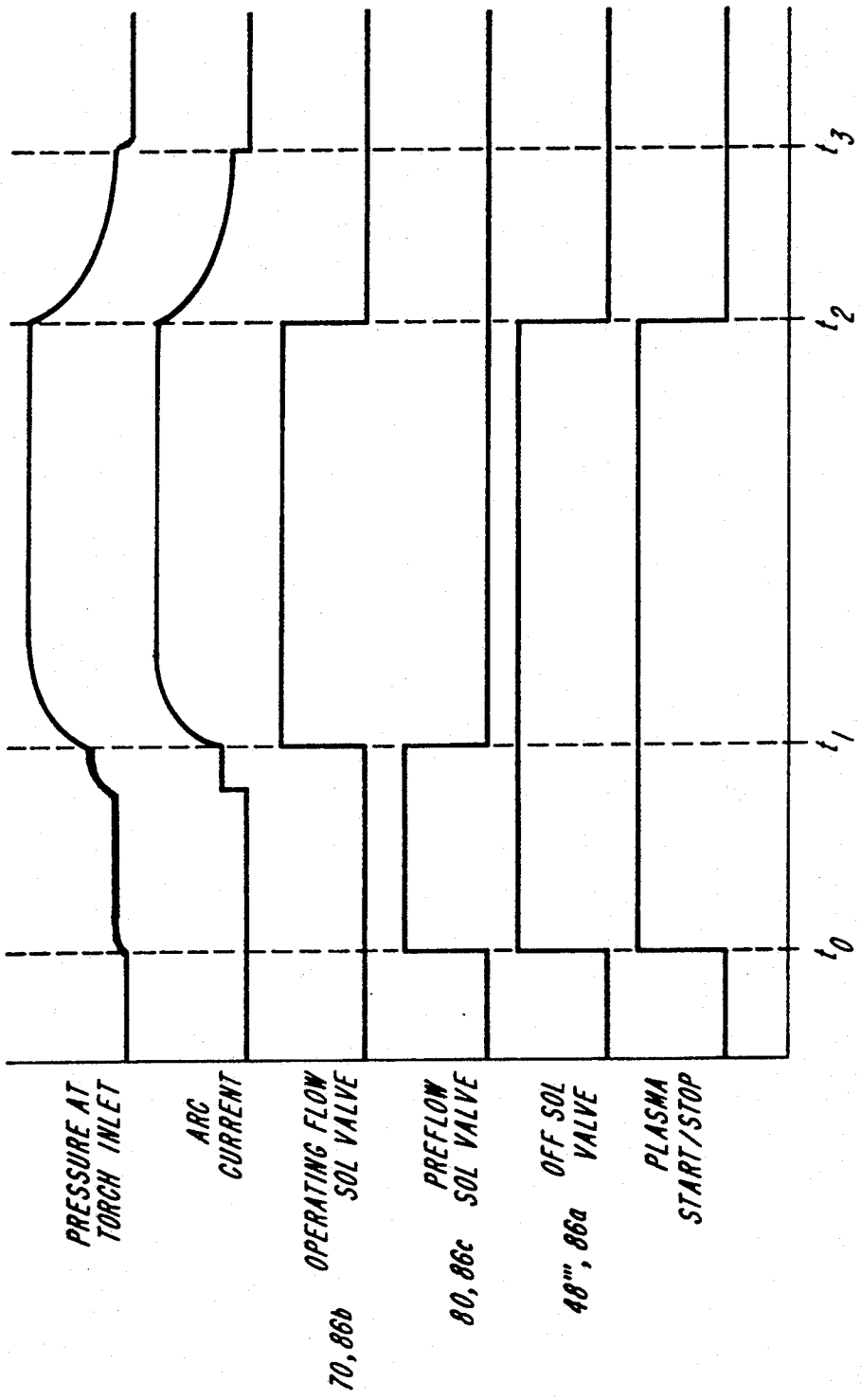
FIG. 5 is a five graph timing diagram of the gas flow alteration on start up.

With reference to FIG. 5, the start of the plasma torch is indicated at $t_o$. A control signal initiated by the operator causes signals to be sent over lines 86a and 86c to open valves 48''' and 80 respectively, but maintain valve 76 in a closed condition. All of the gas flow to the torch therefore passes through, and is limited by, the adjustable orifice 84a. It is set to establish a gas mass flow rate that is (i) sufficient to initiate and sustain a pilot arc in the torch 12''', but also (ii) sufficiently below the full operating value in the transferred arc mode that the improved wear characteristics of the present invention are observed. By way of illustration, a full flow rate can be 40 scfh for a Hypertherm ® MAX 100 brand torch and the preflow can be 24 scfh, or about 60% of the full flow. The precise value for the preflow will vary depending on the factors such as those enumerated above with respect to the timing of the altering of the gas flow on cut off, but it will be within the functional "end limits" given above, that is, being able to ignite a pilot arc while exhibiting the wear improvement of the magnitude described herein. The middle graphs in FIG. 5 reflect valves 48''' and 80 opening at $t_o$. The top graph reflects an increase in the gas pressure in the plasma chamber as a result of the preflow through these valves.

Time $t_1$ in FIG. 5 reflects the time when the arc transfers to the workpiece and the torch begins operating in the transferred arc mode. The time interval $t_0$ to $t_1$ is preferably sufficient to produce a stable preflow. Four seconds is a typical value for this interval. Just prior to $t_1$ there is a small step increase in the arc current, as illustrated in the second graph from the top in FIG. 5. This current is a standard pilot arc current. The pilot arc is ignited after the preflow is stabilized and is maintained for a brief interval before $t_1$, a typical value being 20 milliseconds.

At $t_1$, the transfer of the arc generates another control signal sent over line 86b to open valve 70 as reflected in the third graph from the top in FIG. 5. The power supply also begins to increase the arc current at $t_1$ toward a desired full operating value. At the same time the control signal 86c causes the preflow solenoid valve 80 to close. The opening of valve 70 allows an increased gas flow to the torch as reflected by the rise in the gas pressure at the inlet to the torch as shown in the top graph in FIG. 5. The orifice 74a sets the maximum flow to the torch. Due to the lead from the valves to the plasma chamber, the increase in the gas flow and pressure is not a sharp step function, but rather a smooth ramping up, as shown. The increase in the gas flow is preferably in coordination with the increase in the arc current, also as shown. The current and gas flow need not increase precisely in coordination, but the flow must be increased sufficiently so as to sustain the transferred arc at the current level then prevailing. The flow must also swirl and have a sufficient flow rate to guide the plasma jet and contain it against attacking the torch itself. This valve and conduit arrangement also lends itself to the use of one type of gas as a preflow gas and another type as the plasma gas in a transferred arc mode. Preferably a less reactive gas such as nitrogen or argon is used for the preflow. The switch over from a preflow to an operating flow attendant opening valve 70 and closing valve 80 on arc transfer allows the introduction of a more reactive type of gas such as pure oxygen or air. Alternatively, the preflow can be air and the operating flow can be oxygen. When this preflow and ramp up start procedure is used in combination with the cut off procedures described above, the electrode life can readily and reliably be extended by a factor of about ten.

While the start up features have been described with respect to a change in the flow rate produced by a valve network, the beneficial effects of an axial gas flow evident on cut off also apply to start up. A swirling flow is necessary to control the arc during operation, but at least during the preflow phase when the pilot arc is ignited, the flow pattern can be axial to reduce wear, and then switched over to a swirling flow on transfer at $t_1$. This change in flow pattern can be combined with an increase in flow rate before, at, or after the switch over at $t_1$. The apparatus shown in FIGS. 3A-3D can be used for this flow pattern alteration on start up as well as on cut off.

To end a cycle of operation with the FIG. 4 embodiment and to utilize the cut off advantages described above, the valves 48''' and 70 can be close at $t_2$ causing a decay in the gas pressure and flow. There is a corresponding decrease in the arc current, all as described above with respect to FIGS. 1A-3D. At time $t_3$ the cycle of operation is complete and the torch is off.

Figure 6:
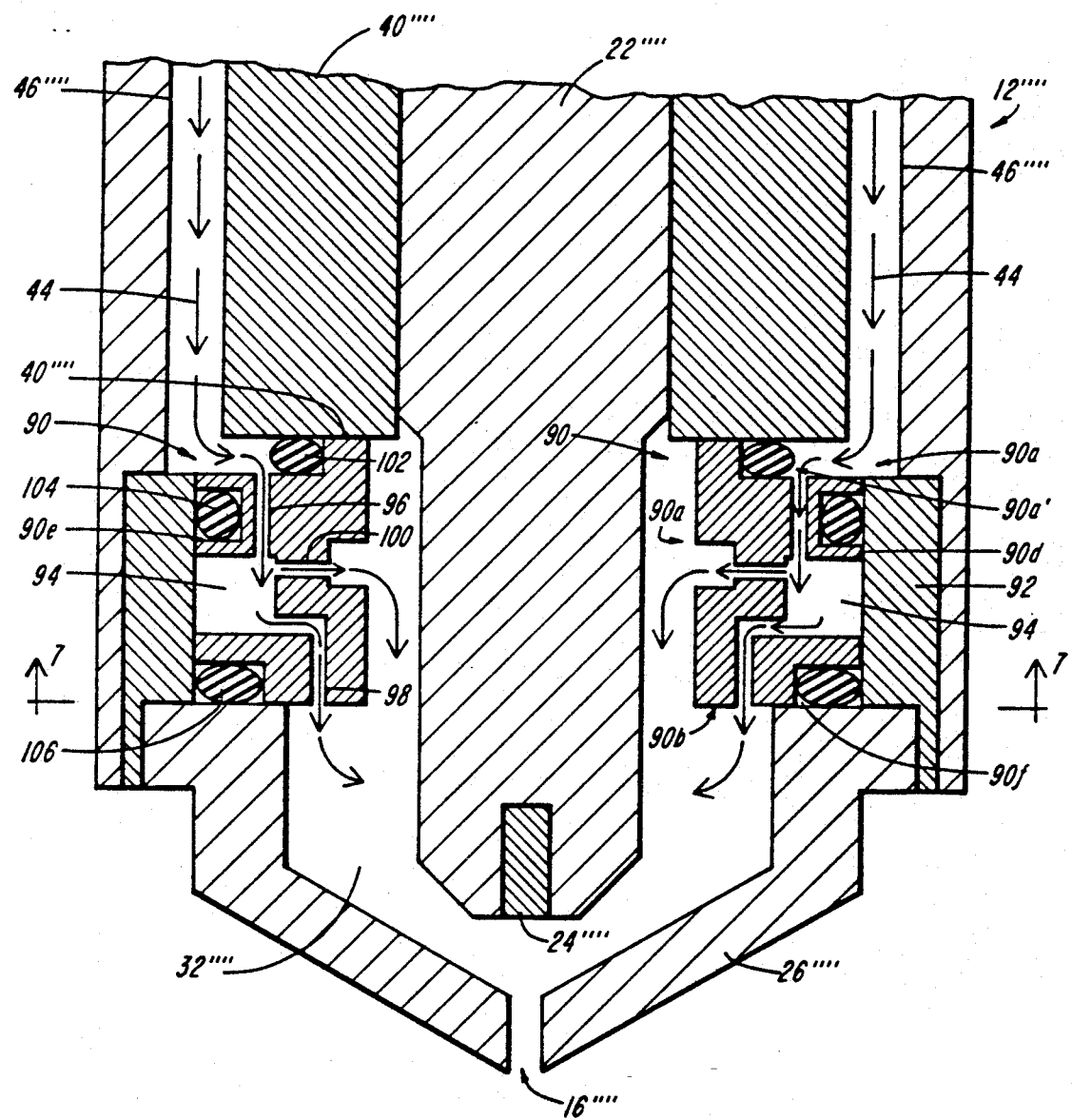
FIG. 6 is a simplified view in vertical section of a swirl ring with a gas control function according to the present invention mounted in a plasma arc torch of the general type shown in FIGS. 1A, 1C, 2A, 2C, 3A, 3D and 4, with the upper portions of the torch body broken away and other components, such as a retaining cap, omitted.
Figure 7:
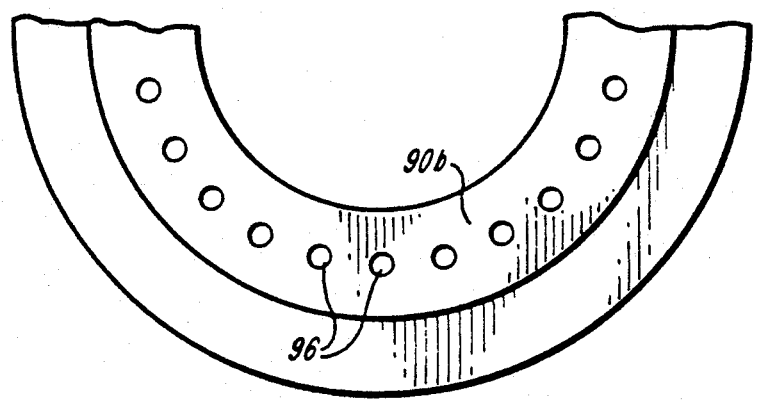
FIG. 7 is a bottom plan view of the swirl ring only shown in FIG. 6 taken along the line 7—7.
Figure 8:
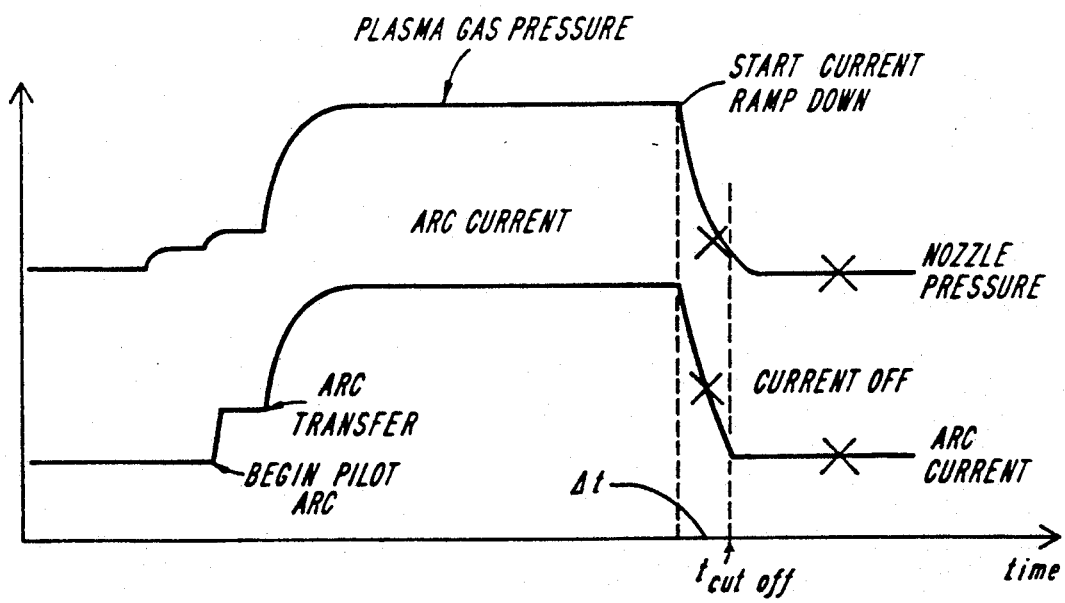
FIG. 8 is a graph plotting the gas pressure in the plasma chamber of the torch shown in FIG. 6 as a function of time during one cycle of operation and also plotting the arc current carried by the plasma over the same cycle of operation.

FIGS. 6-8 show a novel swirl ring 90 according to the present invention which replaces the conventional swirl ring 38 shown in FIGS. 1A, 1B, 2A, 2B, and 3A-3C. The swirl ring 90 is particularly designed for use in conjunction with the gas flow/arc current controls described above with reference to FIGS. 1A-4. It is particularly effective in reducing electrode wear in high power torches such as the Hypertherm ® HT400 and PAC 500 brand torches where the gas flow/arc control procedures described above have proven to be less effective than with lower power torches such as those rated at up to 200 amperes.

It has been discovered that for these high power torches the gas out flow on cut off is sufficiently strong and of sufficiently long duration to produce an unacceptable degree of electrode wear despite the use of the apparatus and processes discussed hereinabove, despite the location of the gas cut off valves 48,48' and 48''' close to the torch, and despite operation with the gas flow being totally shut off just prior to cut off of the arc current, as opposed to merely being significantly reduced in flow rate.

The swirl ring 90 has been found to overcome these problems in high power torches and thereby extend the electrode life to the same extent as described above with respect to FIGS. 1A-4. The swirl ring 90 is a generally annular member formed of a conventional structural material used conventionally for swirl rings. The preferred material is lava rock, which is machinable ceramic. The ring 90 has a generally rectangular cross section, as shown in FIG. 6, with an upstream face 90a in fluid communication with a gas passage 46''''', or an equivalent gas conducting tube or chamber formed in or secured within the torch body 12''''' (like parts in the FIG. 6-7 embodiment being identified with a quadruple prime). The gas flow 44 to the torch flow is substantially unimpeded (except for the action of the various valves and meters described hereinabove) to the upper face 90a. The ring 90 has a lower or downstream face 90b open to the plasma arc chamber 32''''', defined mainly by the electrode 22''''', the nozzle 26''''' and the swirl ring 90 itself, as shown. An inner lateral face 90c is also open to the plasma chamber 32'''''. An outer lateral face 90d abuts a surrounding current ring 92 that is in electrical connection with the nozzle 26'''''.

A principal feature of the swirl ring 90 is a pre-chamber 94 formed in the preferred form shown as a central annular recess in the outer face 90d of the swirl ring. Another principal feature is a set of equiangularly spaced choke holes 96 drilled in the ring 90 and extending from the upper face 90a to the pre chamber 94 to provide a fluid passage for the flow 44 from the passage 46''''', or a comparable structure, to the pre-chamber. It is important that the choke holes 96 are of a number and size that together they conduct a sufficient flow of the working gas to the plasma arc chamber to sustain and stabilize the arc during steady state operation, but at the same time they are sufficiently restrictive to this flow that a significant drop appears in the gas pressure across the holes 96. By way of illustration, but not of limitation, where the pressure in the plasma chamber during steady state operation of a high power torch is 40 psi, the pressure drop across the holes 96 is about 32 psi. Also by way of illustration only, for a nozzle ring suitable for a HT400 brand plasma arc torch manufactured by Hypertherm, Inc., there are six choke holes, spaced equiangularly, each having a constant internal diameter of about 0.018 inch and a length of about 0.136 inch.

The gas entering the swirl ring and held in the prechamber 94 exits to the plasma chamber via set of swirl holes 98 drilled at an angle in the lower face 90b of the ring and a set of radial holes 100 drilled in the inner lateral face 90c. The swirl holes are equiangularly spaced to facilitate a uniform flow distribution of the swirling gas in the plasma chamber. By way of illustration but not of limitation, there are twenty four swirl holes 98, each having a diameter of 0.025 inch and angled at 20° from the vertical to introduce a tangential swirling component to the gas flow exiting the swirl ring. The radial holes also extend from the pre chamber to the plasma chamber to set up an axial flow of gas to the plasma chamber. The number and dimensions of the radial holes 100 is such that they contribute some axial flow into the plasma chamber during steady state operation, but it is introduced upstream of the swirling flow and its flow pattern is overcome by the swirling flow in normal operation. The radial holes aid in distributing the gas uniformly through the plasma chamber, both by contributing a gas flow and by placing the upper end of the plasma chamber at the same gas pressure as the lower end, adjacent the swirl holes 96. By way of illustration but not of limitation, the radial holes 100 are four in number, equiangularly spaced, and have at their minimum diameter the same 0.018 inch diameter as the choke holes.

In the preferred form illustrated and described, the swirl ring 90 requires three seals to provide fluid isolation of the three chambers—the inlet 46'''', the pre chamber 94 and the plasma chamber 32''''. A first o-ring 102 is seated in a shoulder recess 90a' at the upstream face of the swirl ring; it blocks a flow of the gas directly from the gas exit from the torch body to the plasma chamber. The o-ring 102 abuts and seals to a portion 40''' of the torch body. A second o-ring 104 seated in an annular recess 90e formed on the outer face 90d of the swirl ring blocks a direct gas flow from the torch body to the plasma chamber. The o-ring 104 abuts and seals to the current ring 92. The o-rings 102 and 104 force the plasma gas passing through the torch body to pass through the pre-chamber 94 also. A third o-ring 106 seats in an annular recess 90f in the downstream face 90b to block any leakage of gas exiting the swirl ring other than through the plasma chamber 32'''' to the exit orifice 16''''. The o-ring 106 abuts and seals to the nozzle 26''''.

This swirl ring construction places a significant flow restriction, the choke holes 96, very close to the plasma chamber. On cut off, as the plasma cools and there is a sudden out-flow of gas, the pressure drop at the choke holes restricts the out flow of the gas held in the torch body and the relatively short gas conduits spanning the distance between the control valves 48,48' and 48''' and the swirl ring. (The closest upstream valve is closed prior to the arc current cut off to assist in a rapid cut-off of the plasma gas flow in the plasma gas chamber.) The pre chamber 94 therefore acts as a small local reservoir of gas to supply the plasma chamber during the milliseconds between a shut off of the gas flow and a total cut off of the arc current. This is important since the simple expedient of shutting off the gas flow totally prior to arc cut-off (and allowing the residual gas to be used up in cutting) allows the arc to become destabilized and attack the nozzle. The pre chamber is therefore sized to supply a volume of gas to the plasma chamber in the interval $\Delta t$ between the gas shut off and the arc current shut off sufficient to maintain the arc in a stabilized condition, but not sufficient to exhibit a degree of electrode wear characteristic of prior art torches. By way of illustration, but not of limitation, the pre chamber 94 has cross sectional dimensions of about 0.114 inch by 0.187 inch with an I.D. of about 0.764 inch and an O.D. of about 0.996 inch for use with the HT400 brand torch and with the illustrative hole dimensions given above.

FIG. 8 is a graph illustrating the gas control function of the swirl ring shown in FIGS. 6 and 7 when also used with the gas flow and arc current controls on start up and cut off discussed above for a Hypertherm ® MAX 200 brand plasma arc torch. There is a preflow of plasma gas on start up to bring the gas pressure in the plasma chamber to about 4 psi. Firing a pilot arc raises the pressure to about 12 psi. On arc transfer to a workpiece, the plasma gas pressure increases further as the valves are opened and then arc current increases to its full operational value. At the completion of an operating cycle, the arc current is ramped down ($t_{cut-off}$) and the plasma gas flow is shut off at the upstream control valve 48'''. The arc is then stabilized by gas drawn out of the pre-chamber through the holes 98 and 100, with the choke holes 96 restricting an inflow of gas from upstream conduits, passages or chambers in the torch body. Preferably, as shown, the arc current is shut off completely when the plasma gas pressure falls to about 4 psi. Stated in other words, the volume of gas available for a rapid expansion when the arc cuts off and the plasma cools is quite small. This allows the gas control/arc current control procedures described above to operate and to extend the electrode life, even for high current torches. The swirl ring and associated gas flow control features also enhance the electrode life in low to medium power torches.

Another significant aspect of the swirl ring 90 according to the present invention is that it also distributes the gas very uniformly due to the size, number and location of the gas conducting holes 96, 98 and 100 formed in the ring. This is in contrast, for example, to a possible expedient of simply creating a restriction in the gas outlet from the torch body to the plasma chamber. One restriction was found to create non-uniform, high velocity gas jets at the outlet of the restriction which produced a highly uneven wear on the electrode and reduced the quality of the cut in the workpiece. A characteristic of the present invention is that the plasma gas flow pattern is substantially independent of the choke holes; it can be altered using standard techniques used for conventional plasma arc cutting torches.

There has been described a gas flow control process and novel swirl ring construction for reducing the wear on an electrode of a plasma arc torch, particularly a high power cutting torch, but in general for all types of plasma torches, e.g. ones for welding, spraying or other applications. The invention, in any of its embodiments, can reduce the wear that presently occurs on all electrodes to an extent that the life of the electrode is at least doubled and can be as much as ten times or more. The invention allows a given torch to be operated at increased power levels and with reactive gases. These advantages can be achieved with no diminution of cut quality, and using standard electrodes and nozzles. In fact, due to the discovery that the swirling flow does not adversely affect the electrode wear during cutting, and knowing that a strong swirl yields high quality cuts, the swirl strength can now be increased in torches to improve cut quality. Moreover, existing plasma arc torches and complete torch systems can be readily modified to use the present invention.

While this invention has been described with reference to its preferred embodiments, it will be understood that various modifications and alterations will occur to those skilled in the art from the foregoing detailed description and the accompanying drawings. For example, while the invention has been described with respect to a swirl ring containing the choke holes and a pre chamber, these features could be built into the torch body, components forming the torch body, or other components such as even a portion of the nozzle itself or a flange on a retaining cap. The flow control concept of the invention, regardless of the details of its implementation, is that a plasma gas flow restriction is placed in the plasma gas flow path immediately preceding the plasma chamber and a small supply of gas is available downstream of the restriction, but upstream of the plasma chamber. These and other modifications and variations are intended to fall within the scope of the appended claims.

What is claimed is:

1. A process for controlling wear of an electrode in a plasma arc torch at the termination of a cycle of operation where an arc current and plasma gas flow through the torch are cut off, and where the electrode is mounted within a torch body opposite and in a spaced relationship to a nozzle having an exit orifice for a plasma arc, the electrode and nozzle defining a plasma chamber, the torch body including means for directing a flow of an ionizable gas through the torch body to the plasma chamber, and the torch body having a conductive path for an arc current to produce a plasma arc in said gas flow eminating from said electrode both as a pilot arc to the nozzle and as a transferred arc to a workpiece at a full operating arc current value, comprising creating a pressure drop in said flow of ionizable gas immediately upstream of said plasma chamber, said pressure drop being sufficiently low that the gas flow into the plasma chamber at the full operating value produces a gas pressure and gas flow pattern in said plasma chamber that stabilizes the arc, and said pressure drop being sufficiently large that at said arc current cut off the gas pressure and the gas flow through said plasma chamber decays rapidly in coordination with the arc current cut off.

2. The electrode wear control process of claim 1 wherein said creating of a pressure drop comprises restricting the gas flow to the plasma chamber within the torch.

3. The electrode wear control process of claim 1 further comprising the step of producing a local gas chamber in said gas flow between the point of said pressure drop in the torch and said plasma chamber.

4. The electrode wear control process of claim 3 further comprising distributing the ionizable gas flow from said local gas chamber to said plasma chamber in a flow pattern that is swirling.

5. The electrode wear control process of claim 4 wherein said gas distributing also produces a generally spatially uniform flow of said gas through said plasma chamber.

6. The electrode wear control process of claim 1 wherein said gas flow shutting off precedes the arc current cut off by a very brief time interval in which the gas held in said local gas chamber and the plasma chamber stabilize the arc until it is extinguished.

7. The electrode wear control process of claim 6 wherein said arc current cut off is ramped down.

8. A gas control swirl ring for a plasma arc torch having a torch body that mounts a nozzle and an electrode at one end of the body in a spaced relationship that defines therebetween a plasma arc chamber where an arc current conducted through the torch body ignites a plasma arc in a flow of an ionizable gas directed through the torch body to the plasma arc chamber via a gas inlet passage produces a plasma arc that transfers to a workpiece via an exit orifice in the nozzle during operation in a transferred arc mode, comprising a generally annular body having an upstream face in fluid communication with said flow of ionizable gas in the torch body and a downstream face in fluid communication with the plasma arc chamber, a gas chamber formed in the body, a plurality of gas inlet passages extending from said upstream face of the body to said chamber, said passages being sized to restrict the flow of ionizable gas to the chamber and thereby produce a pressure drop in the gas flow, and a plurality of gas distribution holes formed in said body extending between said chamber and the plasma arc chamber to produce a swirling, generally uniformly distributed flow of gas in said chamber.

9. The swirl ring of claim 8 wherein said gas chamber comprises an annular recess formed in the outer surface of said body between said upstream and downstream faces.

10. The swirl ring of claim 9 further comprising an annular first sealing recess formed in said outer surface between said upstream face and first annular recess.

11. The swirl ring of claim 9 further comprising annular second and third sealing recesses formed in the upstream and downstream faces of said body.

12. The swirl ring of claim 8 further comprising a plurality of radially directed holes formed in said body extending from said gas chamber to said an inner surface of said body extending between said upstream and downstream faces and in fluid communication with the plasma arc chamber.

13. The swirl ring of claim 8 wherein each of said gas inlet passages and said gas distribution passages are mutually equiangularly spaced and are at least four in number.

14. The swirl ring of claim 8 wherein the gas pressure in the plasma arc chamber during operation is about 40 psi and said pressure drop is about 32 psi.

* * * * *